UNITED STATES PATENT OFFICE.

WILLIAM IHNE, OF MEDFORD, WISCONSIN.

MANUFACTURE OF EMERY.

SPECIFICATION forming part of Letters Patent No. 368,769, dated August 23, 1887.

Application filed February 23, 1887. Serial No. 228,572. (No specimens.)

*To all whom it may concern:*

Be it known that I, WILLIAM IHNE, of Medford, in the county of Taylor and State of Wisconsin, have invented a new and useful Improvement in the Manufacture of Emery, of which the following is a full, clear, and exact description.

This invention consists in the manufacture, substantially as hereinafter described, of a good quality of artificial emery from a comparatively-worthless raw material—such as poor iron ore rich in silicic acid, but containing too little iron to make it an object of reduction for general use. The principal ingredients of this raw material are silica and alumina, mixed or found together with suboxide of iron, oxide of iron, iron with manganese, and other silicates and aluminates of iron so frequently met with and often forming the out-croppings of beds or veins of magnetic iron ore, brown iron ore, hematite, and many other kinds of iron ore. This raw material I first burn in a furnace of any suitable kind—such, for instance, as the furnace or furnaces used for burning lime, bricks, and cement, or the furnaces used for various metallurgical purposes. The fuel used may be coal, wood, peat-bog, coke, charcoal, or burning-gases, the burning usually occupying from six to thirty-six hours, according to the nature of the raw material and the fuel employed. After removing the burned material from the furnace the same is allowed to cool and is afterward reduced by breaking, stamping, crushing, grinding, or washing, and is assorted or separated into different grades by means of perforated cylinders and sieves into flour and the finer and coarser grades of emery used in commerce. The product thus obtained may be manufactured, as in the ordinary mode of making such articles, into emery-paper, emery-cloth, emery-cakes, emery-sticks, and emery-wheels.

In carrying out this process the material is somewhat hardened in mass, but readily loosened, so that when washed and separated the impurities are more easily removed than if the material were worked in its raw state. The burning, too, gives the material a color similar to that of Naxos emery, and it will be found nearly as hard as natural emery and not so brittle, but somewhat tough, and not only as useful generally as ordinary emery, but frequently preferable thereto, as it will have a greater capacity for resistance against pressure when used in the form of wheels and other articles.

Having thus fully described my invention, I claim as new and desire to secure by Letters Patent—

1. The process herein described of manufacturing emery from iron ore or raw-iron out-croppings or material composed mainly of silica and aluminum, which consists in first burning said substance, then cooling the same and afterward reducing it, and subsequently separating and sifting it into different grades, as herein set forth.

2. The emery product herein described, consisting of burned, reduced, and separated iron ore or material composed mainly of silica and aluminum, substantially as specified.

WILLIAM IHNE.

Witnesses:
CLINTON TEXTOR,
S. A. CORNING.